(12) United States Patent
Hennessey

(10) Patent No.: US 7,388,178 B2
(45) Date of Patent: Jun. 17, 2008

(54) RAPID THERMAL RESPONSE INDUCTION HEATING SYSTEM FOR PLATEN EMBOSSING

(75) Inventor: Michael Hennessey, South Lyon, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 11/415,032

(22) Filed: May 1, 2006

(65) Prior Publication Data
US 2007/0251940 A1    Nov. 1, 2007

(51) Int. Cl.
*H05B 6/10*    (2006.01)
*B29C 59/02*    (2006.01)

(52) U.S. Cl. .................. 219/635; 219/659; 219/675; 219/676; 425/406; 264/293; 264/486

(58) Field of Classification Search ............ 219/635, 219/659, 670, 632, 672–677; 264/293, 486, 264/487; 425/406
See application file for complete search history.

(56) References Cited

U.S. PATENT DOCUMENTS

| | | | | |
|---|---|---|---|---|
| 2,448,009 A * | 8/1948 | Baker | ................... | 219/645 |
| 4,649,249 A * | 3/1987 | Odor | ................... | 219/659 |
| 5,191,181 A * | 3/1993 | Regenscheid | ........... | 219/633 |
| 5,444,220 A * | 8/1995 | Hansen et al. | ......... | 219/633 |
| 6,291,805 B1 * | 9/2001 | Simeray et al. | ......... | 219/621 |
| 2004/0150135 A1 * | 8/2004 | Hennessey et al. | ...... | 264/293 |

* cited by examiner

*Primary Examiner*—Philip H Leung
(74) *Attorney, Agent, or Firm*—Frederick A. Krieger

(57) ABSTRACT

An induction heating system for the manufacturing of optical memory microstructure, wherein the thermal cycle allows the process web to be rapidly heated to the relaxation and re-flow temperature, followed by cooling to the optimum separation temperature in under 10 seconds total process time. The rapid response heating system of the present invention may be achieved through the use of one or rotating asymmetrical induction heating coils which are embedded in the platen(s) of the embossing device.

12 Claims, 3 Drawing Sheets

RAPID THERMAL RESPONSE INDUCTION HEATING SYSTEM FOR PLATEN EMBOSSING

FIELD OF THE INVENTION

The present invention relates generally to optical discs. More particularly the present invention relates to the manufacturing of optical discs. The present invention is a system for embossing a web of polymeric material to produce optical discs therefrom. The system includes a rotating asymmetrical induction heating coil embedded into a platen of the embossing system.

BACKGROUND OF THE INVENTION

The words "melt-forming" and "embossing" should not be used interchangeably. While a stabilizing carrier can be used with either process, traditional embossing and melt-forming are different processes. "Embossing" is essentially a deformation and relaxation process where a pattern is transferred to a material through the application of pressure and, optionally, heat. "Melt-forming" refers to selectively causing the interface between a material and a patterned stamper to behave as a relatively low viscosity fluid. Melt-forming is essentially a wetting process. The transition into the melt-forming regime is typically very abrupt and constitutes a fundamentally different phenomenon compared to traditional embossing.

In our prior U.S. Patent Application Publication Numbers: 20050173071; 20050167890; 20050167885; 20050167866; 20050160893; 20050082698; 20040150135 and 20030006535 (the disclosures of which are hereby incorporated by reference), "melt-forming" allowed achieved full replication fidelity while simultaneously minimizing thermal penetration depth. This technique allowed replication directly onto DVD thickness film (600 microns) without warp.

However, this roll-to-roll process is not suitable for directly replicating onto thinner films, for example 75 to 125 micron films used for next generation optical disks. The thermal penetration depth was too large a percentage of the film thickness, resulting in strong curl. Additionally, the force necessary to peel the hot film from the stamper distorted the track roundness (stretched the film as it was being removed from the stamper).

For these reasons, switching to "platen embossing" for the thin film work was required. The transition to platen embossing required a different approach to producing the flat parts. Rather than attempting to limit the depth of thermal processing, balancing annealing (permanent densification of the polymer as a result of thermal processing history) versus shrinkage (reversible thermal expansion and contraction effects) forces through the full thickness of the film was required. Traditional solutions to this problem involve long heating and cooling time (i.e. tens of seconds to tens of minutes. The desired goal of the present inventors was 3 seconds.

Initial work centered on melt-forming the information bearing surface of the film by using the thermal capacity of the stamper to provide a "pulse" of heat energy. An insulator between the stamper and heated backing platen limited the stamper temperature recovery time. This in combination with the bias heat, applied from the non-stamper side of the film, allowed for melt-forming the information surface and then appling a slightly lower uniform heating from both sides of the film allowed for control of warp.

Unfortunately two problems remained. The still hot film could not be handled without distorting it, and track roundness (ellipticity and higher order distortions) was extremely high. Non-roundness at the outer diameter of greater than +/−100 microns and at the inner diameter of greater than +/−50 microns was typically observed. The handling problem was eliminated by laminating the process film to a stabilizing carrier. This allowed much of the cooling process to be shifted downstream from the embossing station. It also provided a stabilizing carrier for subsequent processing steps such as sputtering.

The non-roundness problem was found to originate with elastic distortions introduced into the film when it was clamped between hot surfaces. The average temperature reached during the process was not high enough to relax these stresses in the allowable pressing time of less than ten seconds. When the press opened, the unrelieved portion of the "clamping stress" relaxed and distorted the track roundness.

An initial solution to this problem was to use a "double strike" process. The process film and carrier were pressed together and laminated in a pre-embossing step. After the press opened residual clamping stress relaxed. This produced a pre-flattened and stress relieved film laminated to a stabilizing carrier. When this stack was subsequently melt-formed, remaining elastic stress was dramatically reduced. We were able to reduce outer diameter non-roundness to about +/−20 microns. This non-roundness result is adequate for DVD disks, but needs to be reduced to under 10 microns peak-to-peak for Blu-Ray disc technology. The only way to accomplish this within the processing time limits was to increase the processing temperature.

Increased process temperature created a cooling problem. If the replicated film was separated from the stamper at or above Tg, replicated feature depth was lost. The solution to this problem was to use the stamper itself as the stabilizing carrier. The replicated film would not be laminated to the surface beneath it, but to the stamper. When the press opened, the stamper and process film would be removed and allowed to cool downstream. The film would be is from the stamper after the temperature fell well below Tg. This procedure allowed for film flatness and reduce non-roundness to below ten microns peak-to-peak. Unfortunately this approach needs to handle multiple stampers which is unacceptable as a production technique. This realization led to the next stage of process evolution.

A "fixed" stamper was needed as well as a processing temperature well above Tg to relieve film stress, cooling below Tg while the replica was in physical contact with the stamper, and a total cycle time of 3 seconds or less. This is where the concept for the "rapid thermal response" tool design originated.

SUMMARY OF THE INVENTION

The present invention is a rapid thermal response induction heating system for the embossing of optical memory microstructure, wherein the thermal cycle allows the process web to be rapidly heated to the relaxation and re-flow temperature, followed by cooling to the optimum separation temperature in under 10 seconds total process time. The rapid response heating system of the present invention may be achieved through the use of one or rotating asymmetrical induction heating coils which are embedded in the platen(s) of the embossing device.

The system of the present invention may include a web of polymeric material adapted to move into and out of a replication zone, a first platen and a second platen, at least one of said first and second platen having a stamper having a microstructure image attached thereto and at least one of said platens having a rotating asymmetrical induction heating coil embedded therein to heat said stamper. The second platen preferably has the rotating asymmetrical induction heating coil imbedded therein. Both the first platen and the second platen may contain a rotating asymmetrical induction heating coil imbedded therein. The first platen and second platen may include heating/cooling fluid channels embedded therein. The second platen may include a pressurisable flexible membrane covering the heating/cooling channels in said second platen. The first platen may further include an insulator layer between the first platen and the stamper, which may be formed of Kapton. The system may further include a substrate carrier onto which the web of polymeric material is laminated. The first and second platen may be formed of steel. The stamper and substrate carrier may be formed of a material selected from the group consisting of nickel, chrome, cobalt, copper, iron, zinc or alloys thereof.

DETAILED DESCRIPTION OF THE INVENTION

Figure 1:
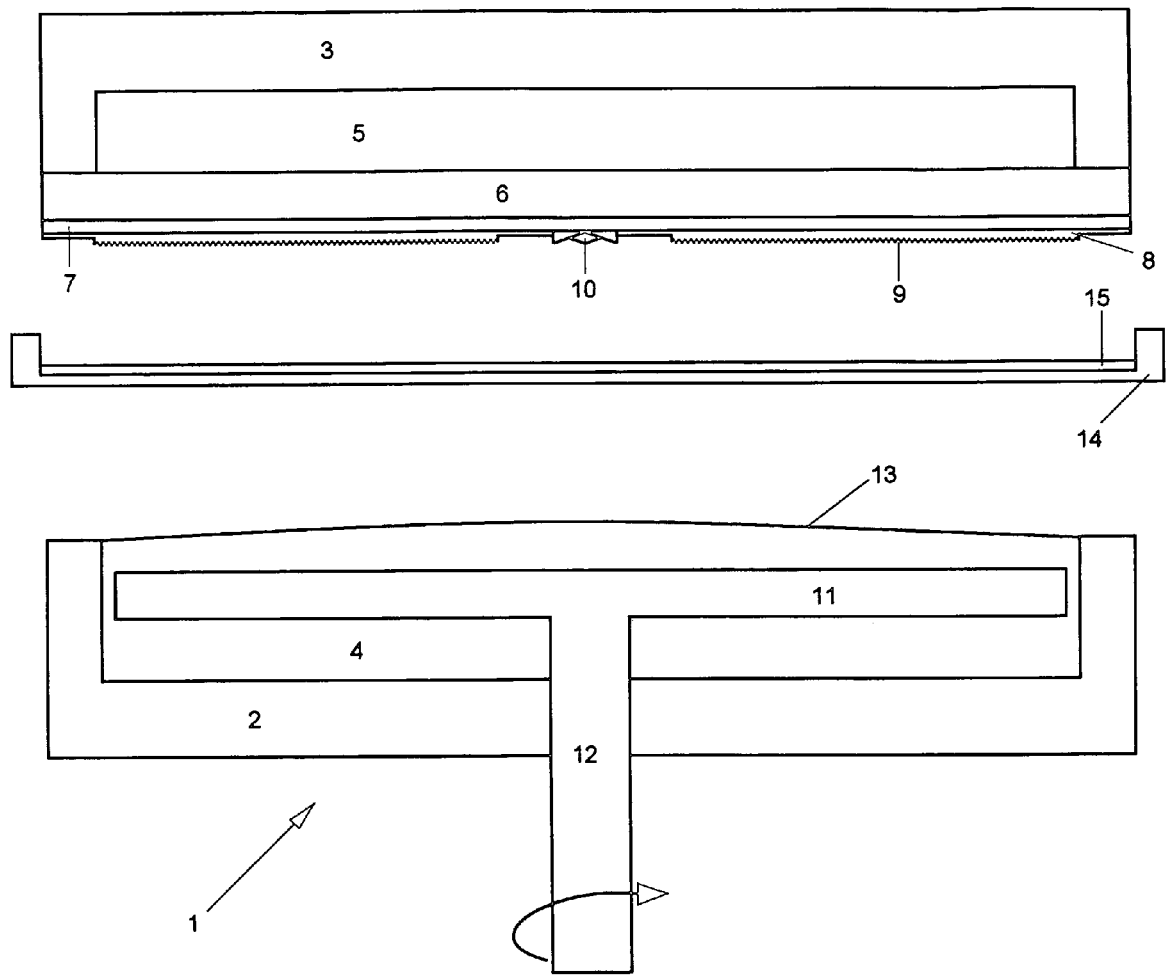
FIG. 1 is a schematic depiction of an embodiment of an apparatus according to the present invention.

What was required to solve the problems discussed herein above was a means of achieving a peak process temperature, controlling the time at this peak temperature, and then allowing the process web/stamper interface to cool to an optimum separation temperature in 10 seconds or less. Such a system would provide the relatively high process temperatures needed for rapid relaxation of stressed and/or displaced material, and also allow stamper/process web separation at an optimum lower temperature.

Handling and clamping related stresses can introduce elastic distortion in the process web. If these stresses are not completely relieved during the embossing process they will relax when the embossing press opens. The shape change associated with this post-embossing relaxation distorts the embossed image. In the case of optical memory disk replication, these distortion adversely affect track roundness. This problem generally becomes more significant as the thickness of the process web is reduced. Relaxation of elastic stress in a polymer is a function of time vs. temperature. Generally speaking a higher temperature results in more rapid relaxation. However, high processing temperature typically requires extended cooling time before the tooling is opened. Separating the process web from the stamper at too high a temperature may result in replicated feature depth reduction, release patterns, and/or sticking.

Material displaced by the features on the stamper must be allowed to smoothly merge with and/or re-flow on the process web. Again, this is a function of time vs. temperature (unless re-flow enhancement techniques are employed). Generally speaking a higher temperature results in a more rapid re-flow. However, high processing temperature typically requires extended cooling time before the tooling is opened. Separating the process web from the tamper at too high a temperature may result in replicated feature depth reduction, release patterns, and/or sticking.

An ideal embossing thermal cycle would allow the process web to be rapidly heated to the relaxation and re-flow temperature, followed by cooling to the optimum separation temperature in under ten seconds total process time. In the case of solvent cast polycarbonate film a representative forming temperature range may be 170-200 C and a representative separation temperature range may be 90-150 C. Thermal modeling and experimentation have shown that this temperature cycle can not be practically implemented using traditional heating and cooling methods.

Induction heating approaches have previously been shown capable of achieving the desired heating and cooling rates. For example, induction heating has been successfully employed in a continuous roller-press configuration. However, achieving the required temperature uniformity in a platen press configuration has proven to be difficult. In configurations with a static relationship between the induction coil and stamper, heating uniformity must be achieved by providing a uniformly profiled, null free induction heating field over the full diameter of the stamper. Producing such a field is inherently problematic.

One approach to solving this problem is to move the induction heating coil past the stamper between embossing cycles. This approach would simulate the induction heating method employed in the continuous roll-to-roll implementation. Unfortunately, the time delay between stamper heating and pressing would result in excessive heat loss. An insulator between the stamper and backing plate would reduce this heat loss, but only at the expense of increased cooling time at the end of the embossing cycle. Additionally, some form of power profiling and/or relative motion between the coil and stamper would be required to achieve uniform stamper temperature when the press closes.

An alternative is to position the induction coil in close proximity to the stamper during the pressing cycle. The advantage of this is that heat can be applied only when it is needed. The insulating properties of the stamper backing surface can be selected for this direct heating configuration, minimizing the cooling time penalty caused by the presence of the insulator. The problem of non-uniform stamper heating can be solved by constructing an asymmetrical coil and rotating it during the heating cycle. In this way the heat capacity of the stamper is used to "store" the average heating exposure from the coil. If the coil is caused to rotate several times during the heating phase the stamper will be raised to uniform temperature. Power can be coupled to the heating coil via a rotary transformer or slip rings.

The rotating field approach can be implemented by locating the induction heating coil external to the tooling. In this case the material selected for the construction of the tool must not significantly interfere with the induction heating field. Materials such as machinable ceramic, quartz, and filled polymers may be used.

Ideally, the rotating coil assembly may be located within one or both halves of the tool. This allows the induction heating coil to be placed nearer to the stamper(s), improving heating efficiency. A potential problem with this approach is the compromised rigidity of the tool. To be most effective, the coil should be within 5 to 10 mm of the stamper(s). Providing a space for coil rotation this close to the pressing surface may result in tool distortion as embossing pressure is applied.

A variation of well known technique to improve embossing pressure uniformity may be used to address this problem. In this approach at least one surface of the tool is comprised of a material that behaves as a fluid. This fluid acts to present a uniform pressure against the work-piece. In this implementation at least one surface of the embossing tooling will be constructed as a hollow cylindrical volume. A flexible membrane will be attached and sealed against the open face of the cylinder. A temperature controlled fluid will be used to pressurize the cylindrical volume as the press closes. In this way the flexible membrane applies uniform pressure against the process film and presses it against the stamper. Additionally, this cylindrical volume provides the space in which to locate the rotating induction heating coil.

In operation, the cylindrical cavity would be pressurized to an intermediate pressure causing the bonded covering to be slightly extended, forming a domed or hemispherical surface. This surface comprises one surface of an opposing platen pressing system. As the press is closed, contact pressure is first applied to the embossing stack near its center. As a result trapped gas is progressively squeezed outward as contact pressure forces the domed surface flat. Timed with the closing of the press, the pressure within the cylindrical volume behind the bonded covering is increased. In this way a conformable interface can be used to produce a high and uniform embossing pressure.

Timed with the press closing, the induction heating system will be activated. By timing the main heating phase with the application of clamping pressure out-gassing bubble formation is suppressed. The pressurizing fluid applied to the pressure chamber may be an efficient heat transfer medium such as oil or water. Fluid temperature may be held constant or controlled in a way that optimizes the embossing thermal cycle. For example, at an appropriate time in the embossing cycle, heated fluid may be directed into the pressurizing cylinder. At the end of the heating phase chilled fluid may be directed into the pressurizing cylinder. A series of automatically controlled valves may be programmed to produce the desired pressurization curve and to change between heating and cooling modes of operation. Alternatively, the pressurizing fluid may be held at a constant temperature. Because of the rapid turnover of fluid within the pressurizing cylinder, significant temperature gradients would not develop, thereby resulting in a uniform heating and cooling environment.

Both halves of the tooling may be constructed utilizing a flexible membrane configuration. In this case the stiffness, elasticity, and conformability of the two membranes may be different. For example, it may be desirable to use a more rigid membrane behind the stamper. Pressurizing fluid temperature may be independently controlled in the two opposing halves of the tooling. Induction heating coils may be used on either or both sides of the tooling. For example, this may be desirable to optimize cycle time and replica flatness.

Alternatively, one half of the tooling may be of conventional rigid construction, and the other constructed utilizing the flexible membrane configuration. In this case the temperature of the rigid tool half may be controlled through the use of conventional machined cooling channels. The temperature of the two tool halves may be independently controlled in order to optimize cycle time and replica flatness.

FIG. 1 is a schematic depiction (not to scale) an example embodiment of a rapid thermal response induction heated platen embossing system 1 according to the present invention. The system includes a lower platen 2 and an upper platen 3. Each of the lower platen 2 and upper platen 3 include heating/cooling fluid (such as water or oil) channels 4 and 5, respectively. The upper platen also includes a thermally conductive face plate 6 onto which is mounted thin layer of thermally insulating material 7 (for example Kapton). A stamper 8 which includes an optical disc pattern 9 to be embossed onto a substrate and an optical disc center hole formation device 10. The lower platen also includes a rotating induction coil 11 which rotates on axle 12. The lower platen also includes flexible membrane 13. The embossing system may also include a substrate carrier plate 14 into which a thin film substrate 15 is placed.

The platen bodies 2 and 3 are preferably made from a thermally conductive material that is also sturdy and can withstand the pressures and temperatures of platen embossing. Typically the material is a metal and more specifically the metal is steel. The face plate 6 of the upper platen 3 is also made of sturdy, thermally conductive material, preferably steel. The face plate 6 must be thick enough to withstand the pressure of embossing without significant warping but also thin enough and conductive enough to transfer heat away from the embossing zone. The instant inventors believe that a range of thickness for the face plate 6 is between 4 and 10 millimeters (preferably 6 millimeters) when the plate is formed of steel.

The thin layer of thermally insulating material 7 may be formed of any thermally insulating material that will withstand the temperatures, pressures, chemistries of the embossing environment. The layer of thermally-insulating material 7 should be thin enough to allow heat to transfer away from the embossing zone into the heating/cooling fluid in channel 5. The layer of thermally insulating material 7 should also be thick enough to provide insulation for the stamper when it is heated by induction heating. That is, during cycling/production, the induction heating coil 11 heats the stamper 8 when it is in contact the thin film substrate 15. Once the stamper is sufficiently heated to melt form the substrate 15 and transfer the optical disc image 9 to the substrate 15, the induction heating coil 11 is turned off and the heat is removed from the stamper 8 and substrate 15 via the coolant in channels 4 and 5. The inventors believe that a range of thickness for layer 7 is between 15 and 40 microns (preferably 25 microns) when layer 7 is formed of Kapton.

The stamper 8 is any tool suitable for melt-forming a desired surface finish and/or impression in web material or an optical memory substrate. The stamper 8 is preferably a disk shaped melt-forming tool, although in alternative embodiments the stamper could have any shape, such as rectangular, oval, triangular, oblate, irregular, etc. Stampers may be optically polished or may have fine features 9 for replicating microstructures, such as the grooves and/or pits typically employed in optical memory disks. The fine features 9 may range from greater than several microns to 0.01 microns or less in width, length and depth. The stamper 8 may also include a center hole punch 10.

The stamper 8 is preferably formed of a rigid material that can be heated to a peak process temperature while maintaining the ability to both form a microstructure on the surface of the web and to easily transfer energy to the interface between the stamper and web of polymeric material upon contact. Representative stamper materials include, nickel, chrome, cobalt, copper, iron, zinc, etc., and various alloys of these metals. Additionally materials selected for specific electromagnetic radiation absorption and/or transmission characteristics may be used. The stamper may be composed of a single monolithic material, or of multiple layers of the same material or of different materials. A typical monolithic stamper is comprised of a 0.1 to 1.0 mm thick plate of material, and is more preferably comprised of an approximately 0.3 mm +/−0.1 mm thick plate of material. However, the stamper may also be comprised of multiple layers of different materials, designed to optimize the thermal response of the melt-forming replication system.

In one embodiment, the stamper(s) may be formed from materials selected to partially or completely absorb specific wavelength bands, including for example low frequency, high frequency, very high frequency, ultra high frequency, microwave, infrared, visible, and/or ultraviolet radiation. Representative structures may include relatively thin absorbing layer(s) formed over a transmitting backing substrate and/or carrier insert. Multiple layers may be employed to optimize heating phase energy absorption and cooling phase heat transfer to the backing material, in this way the melt-forming time vs. temperature curve may be optimized. The backing substrate and/or carrier insert material may be maintained at a relatively low temperature, for example near Tg. In this way a rapid responding, low heat capacity structure(s) may be formed that allows controlled heating and controlled cooling of the stamper/web interface. A similar structure may be formed on the surface of the opposing stamper carrier insert to absorb radiation passed by the first stamper and web, increasing absorption efficiency and heating uniformity. Additionally, both stamper carrier insert assemblies may be used to directly input energy to the system and to provide controlled cooling. At the end of the heating cycle, the combination of stamper thermal conductivity, backing substrate thermal conductivity, and backing substrate temperature allows the web material to be cooled at an optimum rate to minimize stress and birefringence, while still achieving a replication cycle time of less that 10 seconds. Appropriate backing materials depend on the frequency of the electromagnetic energy. Selected metal alloys and ceramics may be appropriate for lower frequency operation. Silicon, glass, glass-ceramic, and quartz may be appropriate for higher frequencies, including microwave, infrared, visible and ultraviolet.

The lower platen 2 of the embossing system 1 of the present invention may include a rotating induction heating coil 11 used to inductively heat the stamper 8. The rotating induction heating coil 11 rotates on axle 12. As discussed herein above, power can be coupled to the heating coil via a rotary transformer or slip rings as is known in the art. The induction heating coil 11 is preferably asymmetric with respect to the axis of rotation so that as the coil 11 rotates on axle 12, the overall average heating effect of the coil 11 on the stamper 8 is uniform. This allows for simple design of the pattern of the coil 11 without worries of stronger or weaker induction field strength in different parts of the coil 11.

Induction heating occurs by exposing the stamper 8 to an oscillating magnetic field. The magnetic field is produced by passing an alternating current through the conducting coil 11 situated near the stamper. The applied field induces eddy currents in the stamper 8, and the eddy currents generate heat by resistive effects. The induced eddy currents generally flow perpendicular to the applied magnetic field and tend to roughly mimic the coil current. Thus, to be susceptible to induction heating, the stamper 8 must be electrically conductive and be able to define electric paths which approximate the shape of the coil.

There are certain basic principles that apply to induction heating:

1) Increasing the current in an induction coil increases the heating rate. For eddy current heating the power (heat in watts) generated in a given heating agent is proportional to the square of the current induced in the heating agent ($P=I^2 R$). Thus, if the current in the coil is doubled, the current induced in the heating agent is doubled and the resultant power is 4 times as great.

2) The closer the coil is to the heating agent the more rapid the heating. The electromagnetic field varies inversely with the square of the distance between the coil and the heating agent. Thus if the distance between the coil and the heating agent is doubled the field strength is ¼ as strong, which, in turn, induces ¼ as much current in the heating agent. As noted above, for eddy currents power (heat) is proportional to the square of the current. If the current is reduced to ¼, the power is reduced to ¹⁄₁₆.

3) Higher frequencies tend to lead to more rapid heating of heating agents. In hysteresis heating this is attributable to the greater number of times the dipoles must realign themselves per second and the heat generated with each realignment. In eddy current heating, according to Faraday's law, the voltage of electromagnetic force induced in the heating agent is proportional to the rate at which the field is changing in lines per second. Thus increasing the frequency proportionally increases the voltage induced (which in turn proportionally increases the resultant current). The effects of increased current on power (heat) generated are noted above.

4) The intensity of the magnetic field is multiplied by the number of turns in the coil. The simplest of coils is a single turn coil in which one lead comes out from the generator, makes a loop or turn and returns to the generator via the other lead. The solenoid coil is similar to the single turn coil except that it has two or more turns. The product of the current in the coil multiplied by the number of turns (ampere turns) determines the strength of the magnetic field inside the coil. Thus, for a given current a 6 turn coil has 6 times the magnetic field of a single turn coil, induces 6 times as much voltage in the same heating agent, creating eddy currents that are 6 times as strong and, because the heating agent is the same the resistance is the same, therefore the power (heat) generated is 36 times as high ($P=I^2 R$).

5) The smaller the coil or the closer the two legs of the coil are the more intense the magnetic field is inside the coil or between the legs. This is due to the proximity effect. If the coil is large or the distance between the legs is large the electrical current is evenly distributed around the copper tubes or other materials that form the coil, as is the magnetic field. As the distance between the coil legs or the coil size decreases the inductance between the portions of the copper tubes which are in proximity with each other decreases, which shifts the current carried by the copper tube in the same manner which, in turn, shifts the magnetic field accordingly. Thus the magnetic field becomes more intense as the coil becomes smaller or the legs of the coil become closer together.

The induction heating coil may comprise a flat spiral wound induction coil encapsulated in a layer of non-electrically conductive material such as plastic, mica or ceramic. The coil is preferably wound with a stranded wire, such as copper wire, and has two leads extending beyond the encapsulation for connection with the corresponding AC power source. The first lead extends from the center of the coil, and the second lead extends from the periphery of the coil. Instead of stranded wire, the induction coil alternatively may be made of hollow tubing so that a coolant such as water can be passed therethrough. The tubing must comprise an electrical conductor (e.g., copper) capable of carrying sufficiently large currents. When the coil comprises coolant carrying tubing, the thermal insulation layer can be located between the core and the induction heating coil instead of between the induction heating coil and the skin layer. Examples of thermal insulation layers may include plastics, plastic composites and ceramics to prevent heat generated in the replication zone at the web/stamper interface from transferring to the respective platen. The flat coil configuration is only illustrative and should not be considered limiting. The coil density is chosen to provide a desirable circuit impedance in the circuit comprising the coil, the AC power source and the tooling. Generally, the lower the coil density is, the higher the frequency of the power source will be.

The lower platen 2 also includes a flexible membrane 13. This flexible membrane 13 is formed of a material that can conform under pressure to surfaces onto which it is pressed (for example a deformable elastic polymer. The flexible membrane 13 will be attached and sealed against the open face platen 2. The coolant fluid will be used to pressurize the cylindrical volume as the press closes. In this way the flexible membrane applies uniform pressure against the substrate 15 (and substrate carrier 14) and presses it against the stamper 8.

In operation, the heating/cooling fluid in channel 2 would be pressurized to an intermediate pressure causing the bonded elastic membrane 13 to be slightly extended, forming a domed or hemispherical surface. This surface comprises one surface of an opposing platen pressing system. As the press is closed, contact pressure is first applied to the embossing stack near its center. As a result trapped gas is progressively squeezed outward as contact pressure forces the domed surface flat. Timed with the closing of the press, the pressure within the lower platen 2 behind the elastic membrane 13 is increased. In this way a conformable interface can be used to produce a high and uniform embossing pressure. The flexible membrane 13 may also include a metal layer to provide additional support. The total thickness of the membrane 13 should be on the order of 100 to 150 microns (with 125 microns being preferred). Alternatively, and more preferably, the membrane 13 does not include a metal layer, and such a layer is provided as the substrate carrier 14.

The substrate carrier 14 is preferably a thin, highly polished sheet of metal onto which the substrate 15 becomes laminated. The carrier may be formed of materials that are transparent or translucent to the frequency of the induction heating coils energy such that the energy passes through the carrier 14 and heats the stamper 8. The carrier 14 may also be heated by the induction heating coil if desired and can help to heat the substrate 15. Some materials of construction for the carrier are nickel, chrome, cobalt, copper, iron, zinc, etc., and various alloys of these metals. Additionally materials selected for specific electromagnetic radiation absorption and/or transmission characteristics may be used as discussed above. The carrier 14 may be composed of a single monolithic material, or of multiple layers of the same material or of different material. The carrier 14 may also include an outer ring that encircles and bounds the substrate 15 to form an embossing chamber edge.

Figure 2:
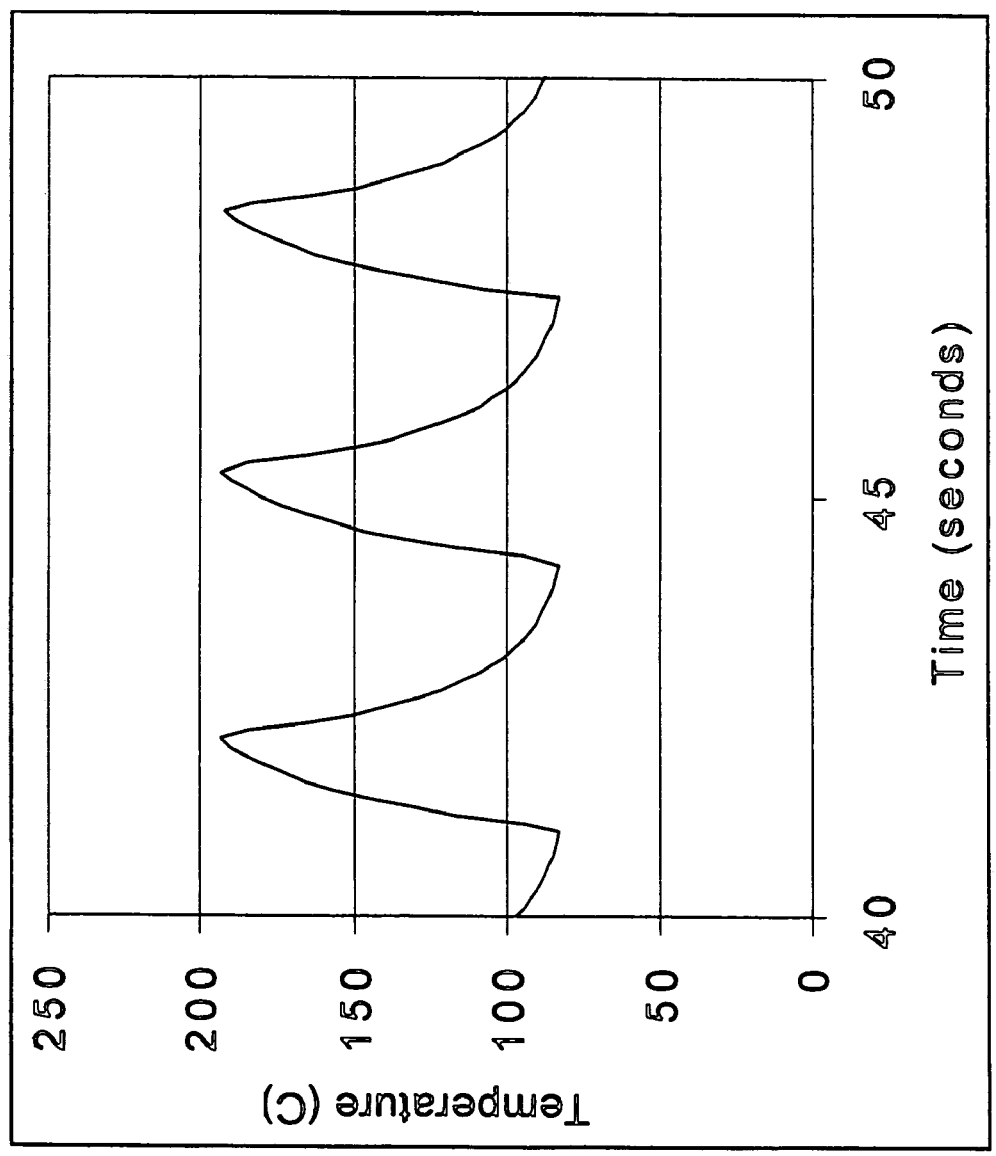
FIG. 2 is a thermal modeling plot of temperature versus time showing stable three second cycling of an embodiment of an apparatus according to the present invention.
Figure 3:
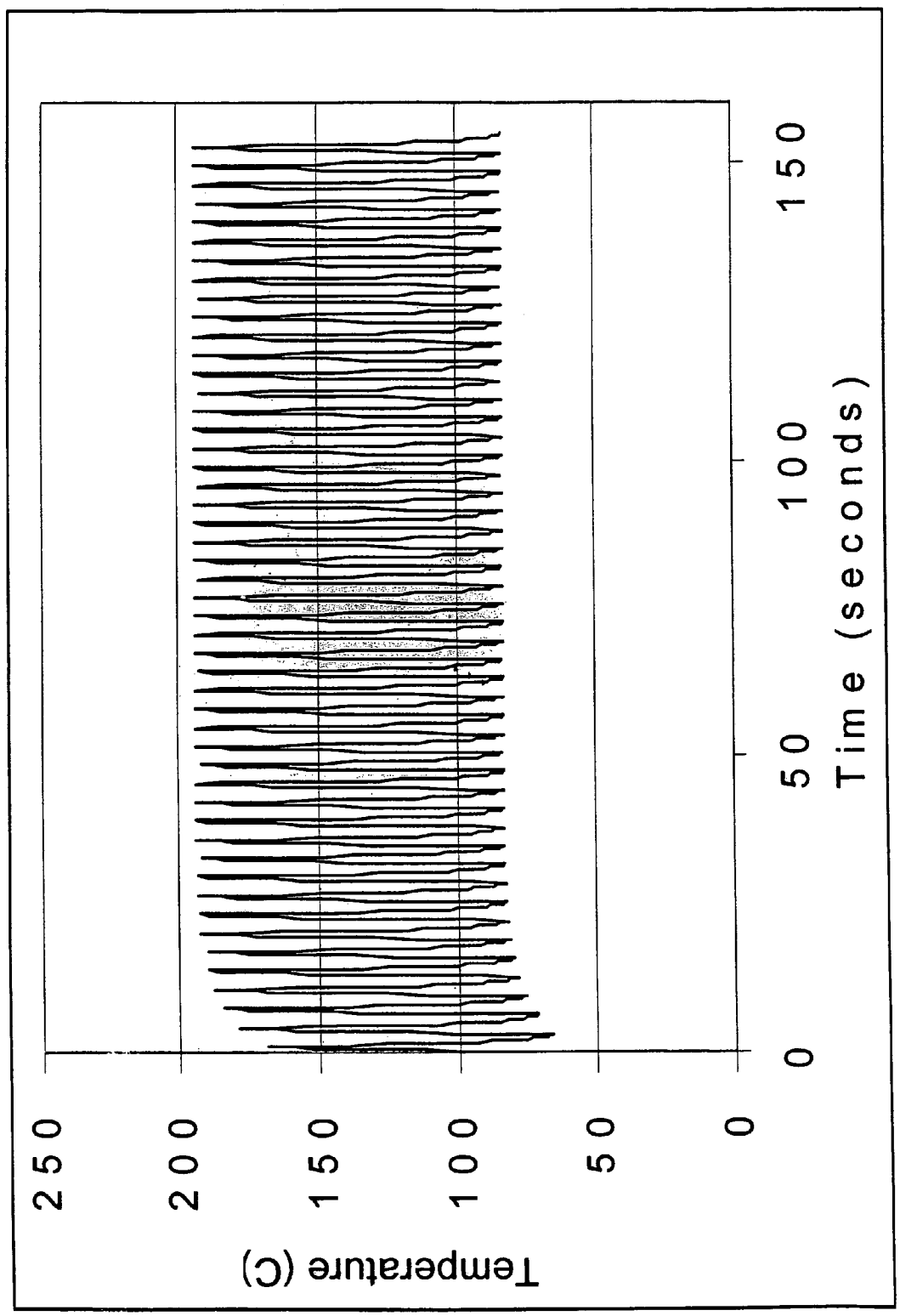
FIG. 3 is an extended plot of same graph as FIG. 2 showing quick stabilization of the peak and trough temperatures of stable three second cycling of an embodiment of an apparatus according to the present invention.

The thermal performance of a platen embossing with a rapid thermal response induction heating system according to the present invention has been modeled by the instant inventors. FIG. 2 is a plot of the temperature of the substrate in degrees Celsius on the y-axis versus time on the x-axis. The plot specifically shows that, when using the embossing production device of the present invention a temperature cycle time of 3 seconds is possible while maintaining stable starting and ending temperatures. Thus with a 1 second heating time and a 2 second cooling time the present apparatus can be run at steady state as long as desired. FIG. 4 shows an extended plot similar to FIG. 3 showing the longer term stability of the production cycling of a platen embossing with a rapid thermal response induction heating system according to the present invention. As can be seen, the peak and trough temperatures of the thermal cycle of the embossing apparatus quickly stabilize over the first 5-7 cycles and are relatively stable thereafter.

Thermal modeling of other systems which heat and cool the stamper by heating the platens using heating/cooling fluid have shown that these device do not stabilize when cycle times are this short. Such devices require cycle times as long as 10's of seconds to perform exhibit stable performance.

Although the apparatus disclosed herein may have wide application in forming web material of all kinds, the web material is preferably a polymeric material of suitable optical, mechanical and thermal properties for making optical memory disks. Preferably, the web material is a thermoplastic polymer, such as polycarbonate, polycyclohexylethylene, poly methyl methacrylate, polyolefin, polyester, poly vinyl chloride, polysulfone, cellulosic substances, etc. The web material preferably has a refractive index suitable for use in optical memory disks (for example, 1.4 to 1.8). The web thickness is preferably about 0.02 mm to about 0.6 mm, depending upon the intended application. The invention of the current application is particularly useful for melt-forming a thin film, i.e. a web with a thickness of 0.25 mm or less. The web is preferably wide enough for replicating one, two, three, four, or more images across the web. The web material may contain one or more additives, such as antioxidants, UV absorbers, UV stabilizers, fluorescent or absorbing dyes, anti-static additives, release agents, fillers, plasticizers, softening agents, surface flow enhancers, etc. The web material is preferably a prefabricated roll, formed "off-line", which may be supplied to the substrate forming apparatus at ambient temperature. Supplying the web material in the form of a roll to the system at ambient temperature allows for greater process flexibility and efficiency.

While the invention has been illustrated in detail in the drawings and the foregoing description, the same is to be considered as illustrative and not restrictive in character as the present invention and the concepts herein may be applied to any formable material. It will be apparent to those skilled in the art that variations and modifications of the present invention can be made without departing from the scope or spirit of the invention. For example, the dimensions of the optical substrates, and the microstructures formed therein can be varied without departing from the scope and spirit of the invention. The materials used to construct the various elements used in the embodiments of the invention, such as the flat stamper(s), stamper support(s), stamper backing material, carrier insert(s), and the induction heating system, may be varied without departing from the intended scope of the invention. Furthermore, it is appreciated that the support for the platens, stamper carrier insert(s) and the stamper(s) could be integrated so as to provide one structure. Still further, it is appreciated that the present invention extends to embodiments that use optical memory substrates in any form, be that web, sheet, or otherwise. Further, by using one or more of the embodiments described above in combination or separately, it is possible to make optical memory disks having information and/or tracking structure that utilizes a web of polymeric material in an melt-forming process incorporating a substantially flat tool and/or stamper, provide optimum heating and cooling through an induction heating system to minimize warp reduce the effects of web surface defects and thickness variation, create a center hole through the web during the replication process and that may also provide mechanical stability and heat sinking for the thin web during subsequent manufacturing steps. Thus, it is intended that the present invention cover all such modifications and variations of the invention that come within the scope of the appended claims and their equivalents.

We claim:

1. A system for embossing an optical disc image onto the surface of web of polymeric material comprising:
   a section of the web of polymeric material adapted to move into and out of a replication zone;
   a first platen and a second platen, at least one of said first and second platen having a stamper having a microstructure image attached thereto;
   at least one of said platens having a rotating asymmetrical induction heating coil embedded within the platen to heat said stamper; and
   a device for rotating said asymmetrical induction heating coil.

2. The system of claim 1, wherein said first platen comprises said stamper and said second platen comprises said asymmetrical induction heating coil.

3. The system of claim 2, wherein said first platen further comprises an induction heating coil embedded within said first platen.

4. The system of claim 1, wherein at least one of said first platen and said second platen further comprises a heating/cooling cavity embedded therein.

5. The system of claim 4, wherein both of said first platen and said second platen includes a heating/cooling cavity embedded therein.

6. The system of claim 4, wherein said at least one of platens having said asymmetrical induction heating coil further comprises a pressurisable flexible membrane covering the heating/cooling cavity in the platen.

7. The system of claim 1, wherein said at least one of platens having said stamper further comprises an insulator layer.

8. The system of claim 7, wherein said insulator layer is formed of a polyimide film.

9. The system of claim 1, further comprising a substrate carrier onto which the section of the web of polymeric material is laminated.

10. The system of claim 9, wherein said substrate carrier is formed of a material selected from the group consisting of nickel, chrome, cobalt, copper, iron, zinc or alloys thereof.

11. The system of claim 1, wherein said first and second platen are formed from steel.

12. The system of claim 1, wherein said stamper is formed of a material selected from the group consisting of nickel, chrome, cobalt, copper, iron, zinc or alloys thereof.

* * * * *